(12) United States Patent
Kerkhoff et al.

(10) Patent No.: US 8,734,051 B2
(45) Date of Patent: May 27, 2014

(54) APPARATUS FOR AERATING AND DRAINING

(75) Inventors: Dirk Marinus Kerkhoff, Rosedale (CA); J. Cornelis Kerkhoff, Rosedale (CA)

(73) Assignee: Buildworks Systems, Inc., Rosedale (CA)

( * ) Notice: Subject to any disclaimer, the term of this patent is extended or adjusted under 35 U.S.C. 154(b) by 281 days.

(21) Appl. No.: 13/032,134

(22) Filed: Feb. 22, 2011

(65) Prior Publication Data

US 2011/0204529 A1 Aug. 25, 2011

Related U.S. Application Data

(60) Provisional application No. 61/306,651, filed on Feb. 22, 2010.

(51) Int. Cl.
*E02B 11/00* (2006.01)
*F16L 1/06* (2006.01)

(52) U.S. Cl.
USPC .......................................... 405/43; 405/184.4

(58) Field of Classification Search
USPC ......... 405/36, 38, 43, 44, 45, 47, 48, 50, 118, 405/119, 184.4, 2; 404/2, 4
See application file for complete search history.

(56) References Cited

U.S. PATENT DOCUMENTS

| | | | |
|---|---|---|---|
| 3,582,533 A * | 6/1971 | Albright et al. | 405/157 |
| 3,675,432 A * | 7/1972 | Keene | 405/157 |
| 3,714,786 A | 2/1973 | Evans et al. | |
| 3,898,778 A | 8/1975 | Erickson et al. | |
| 4,090,686 A * | 5/1978 | Yarbrough | 405/184.4 |
| 4,183,484 A * | 1/1980 | Mathews | 405/184.4 |
| 4,365,911 A * | 12/1982 | Rossberg | 405/43 |
| 4,374,078 A | 2/1983 | Richardson | |
| 4,787,773 A * | 11/1988 | Kehler | 405/36 |
| 4,838,727 A | 6/1989 | Capuano | |
| 5,316,410 A | 5/1994 | Blume | |
| 5,380,121 A * | 1/1995 | Schluter | 404/14 |
| 5,529,436 A * | 6/1996 | Meyers | 405/118 |
| 5,564,857 A * | 10/1996 | Schluter | 405/36 |
| 5,597,264 A * | 1/1997 | Laak | 405/36 |
| 5,785,457 A * | 7/1998 | Thompson et al. | 405/184.4 |
| 5,836,716 A * | 11/1998 | Johnson et al. | 405/43 |
| 5,908,266 A * | 6/1999 | Miller | 405/41 |
| 6,000,881 A * | 12/1999 | Becker et al. | 405/119 |
| 6,120,209 A * | 9/2000 | Evans | 405/43 |
| 6,494,642 B1 * | 12/2002 | Daly | 405/36 |
| 6,663,317 B1 * | 12/2003 | Williams et al. | 405/48 |
| 6,746,179 B1 * | 6/2004 | Kerkhoff | 405/45 |
| 6,905,285 B2 * | 6/2005 | Little et al. | 405/36 |
| 7,040,839 B1 * | 5/2006 | Mazzei | 405/45 |
| 7,264,418 B1 * | 9/2007 | Houck | 405/43 |
| 2007/0274781 A1 * | 11/2007 | Aubusson et al. | 405/36 |

* cited by examiner

*Primary Examiner* — Frederick L Lagman
(74) *Attorney, Agent, or Firm* — Westerman, Hattori, Daniels & Adrian, LLP

(57) ABSTRACT

An aeration and drainage system includes an aeration & drain pipe which contains slots on its upper surface, a stand which holds said aeration & drain pipe above a bottom surface, an air and liquid transfer element attached to the aeration & drain pipe and positioned over said slots. Additionally the air and liquid transfer element extends upward from the slots, and the air and liquid transfer element contains openings on its top to allow fluids to flow into the air and liquid transfer element and through the slots in the aeration & drain pipe.

19 Claims, 9 Drawing Sheets

APPARATUS FOR AERATING AND DRAINING

This application is a non-provisional application claiming benefit of provisional application 61/306,651 filed on Feb. 22, 2010.

BACKGROUND OF THE DISCLOSURE

The following description sets forth the inventor's knowledge of related art and problems therein and should not be construed as an admission of knowledge in the prior art.

The present disclosure relates to an aeration and drainage system used for example in composting and dairy farms. Prior to this disclosure, the following techniques were employed in an attempt to aerate and/or drain a floor surface.

A first example, U.S. Pat. No. 3,714,786 to Evans et al. teaches an open slot culvert for positioning in a drainage area with the open slot at the top so that any surface drainage water will flow through the slot and directly into the culvert, including a method and apparatus for its manufacture. The improved open slot culvert comprises a metallic, pipe section, split longitudinally along its upper side to form a narrow slot, and grate means, including two spaced, vertical bearing members joined by spacer means, secured in the slot. The method of making the improved open slot culvert includes the steps of providing two elongated, parallel, vertical members in spaced relation having a plurality of spacer means therebetween, longitudinally splitting the upper side of a metallic pipe section to form a narrow slot, and properly positioning the grate means within the narrow slot. The apparatus for making the improved open slot culvert generally comprises an entry pipe station, a pipe clamp, saw and tack welding station, and a finish welding and exit station.

A second, U.S. Pat. No. 3,898,778 to Erickson et al. teaches an improved method for cast-in-place construction of a concrete drainage conduit immediately below an integral concrete floor surface, including floor surface, including a longitudinal slot for discharge of surface fluids into said conduit. A water-inflated, fabric-reinforced plastic tubular form and longitudinal slot-forming inserts, used during the concrete pouring operations, are later retrieved at one end of the conduit for reuse following deflation of the tubular form. Conduits of non-circular cross section may be formed if desired. This improved method is useful for construction of drainage facilities for flushable slotted floors for cattle confinement feedlots and for other paved surface such as auto parking areas, roadway and airports.

A third example, U.S. Pat. No. 4,374,078 to Richardson teaches a method of floor drainage trough installation to prevent gaps between the upper edge portions of the side walls of the floor drainage trough and the body of concrete in which the trough is set, such gaps resulting from shrinkage of the concrete as the body of concrete is cured, strips of woven glass fiber material are provided in the upper edge portions of the side walls of the trough during the molding thereof, with closely spaced loops of the glass fiber material of which the strips are formed being coated with the plastics material of which the trough is formed during the molding of the trough and outwardly projecting under the influence of the inherent resiliency thereof by removing the trough from the mold prior to the plastics material becoming fully set. The loops are securely embedded in the body of concrete, so that during the curing of the body of concrete the shrinkage thereof causes slight splaying apart of the upper edge portions of the side walls of the trough, thereby preventing formation of the above-mentioned gaps.

A fourth example, U.S. Pat. No. 4,838,727 to Capuano teaches a one-piece slotted conduit having a thin inner body section and an encompassing frame structure. The encompassing frame structure having specially designed recesses formed in it to ensure maximum conduit strength and an economic use of material. The slotted conduit also including male/female interconnecting ends which ensure easy and accurate alignment of a plurality of conduits in an interconnected system.

A fifth example, U.S. Pat. No. 5,316,410 to Blume teaches this invention relates to the draining of foundations by using an elongate subterranean drainage structure located approximately horizontally and parallel to the foundation in combination with a plurality of elongate upwardly extending hollow drain structures extending from the structure toward the surface of the earth. Hydrostatic pressure of water in the soil forces water through holes in the upwardly extending drain structures. The water then passes rapidly to the bottom of the upwardly extending drain structures by the force of gravity and thereupon into the horizontal drain structure wherein it is carried away from the foundation.

SUMMARY OF THE DISCLOSURE

In each of the above discussed patents, none provided an effective way to drain leachate or other fluids from compost piles while also aerating the compost pile, nor a practical and efficient way to install and construct such drainage and aeration systems. The inventors of the present disclosure sought a way to effectively drain leachate and aerate while providing a rugged and durable system which could withstand heavy loads, including heavy machinery positioned over the drainage and aerating system, and would allow an efficient installation procedure An embodiment of the aeration and drainage system of the present disclosure includes a aeration & drain pipe which contains slots on its upper surface, a stand which holds said aeration & drain pipe above a bottom surface, an air and liquid transfer element attached to said aeration & drain pipe and positioned over said slots, wherein said air and liquid transfer element extends upward from said slots, wherein said air and liquid transfer element contains openings on its top to allow fluids to flow into the air and liquid transfer element and through the slots in the aeration & drain pipe.

The aeration and drainage system is typically located in a reinforced concrete floor which may bear the weight of heavy machinery and heavy loads. Once the aeration and drainage system is assembled and positioned, concrete is poured and spread over the aeration and drainage system. Thus, the aeration and drainage system becomes a permanent fixture in the floor. This presents a challenge when the air and aeration & drain pipes become clogged.

To achieve an efficient and cost effective cleaning method, a clean-water delivery system can be incorporated into the aeration and drainage system. The aeration and drainage system can be connected to the clean-water delivery system which can pump clean water through the aeration & drain pipes, thereby removing any unwanted debris located within the aeration & drain pipes.

Further, a method of draining fluids from a floor and aerating a floor surface has also been developed. This method includes placing a frame down on a surface, placing an air and aeration & drain pipe with slots located on its top, on said frame, attaching an air and liquid transfer element to said air and aeration & drain pipe, wherein said air and liquid transfer element contains openings to allow fluids to pass through and into said aeration & drain pipe, wherein said openings are even or slightly recessed from a surface of the floor.

This aeration and drainage system has many applications including use in composting, dairy farms, or other industrial facilities.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION OF THE DRAWINGS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 1:
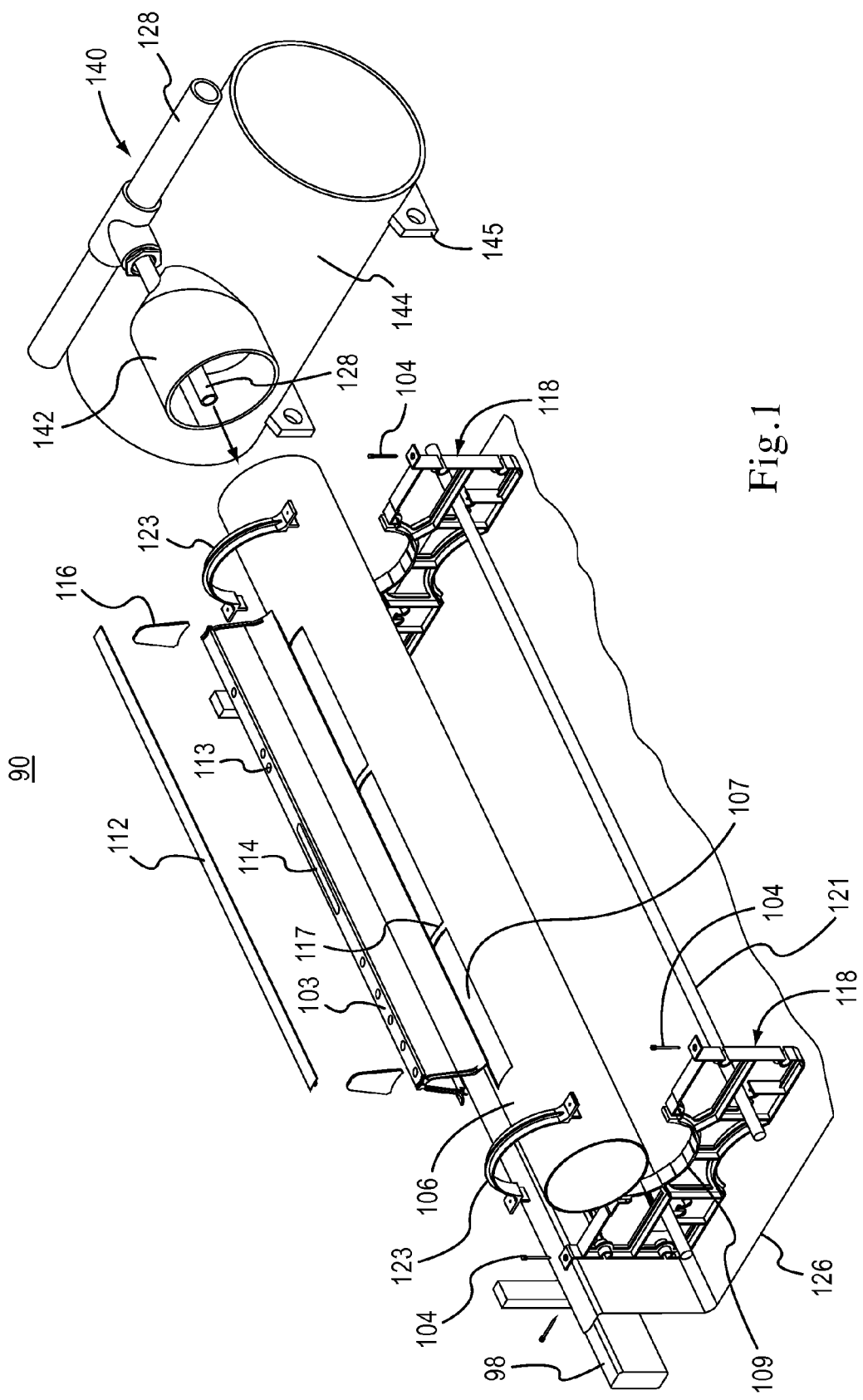
FIG. 1 is a perspective, exploded view of a first embodiment of the aeration & drain pipe, air and liquid transfer element, and frames with the water jet and air flow system.

FIG. 1 shows an exploded view of a first embodiment of a drainage and aeration system 90. As shown in FIG. 1, an aeration & drain pipe 106 is positioned on frames 118. Aeration & drain pipe 106 is made from polyvinyl chloride (PVC) or any other suitable material which is durable and capable of draining leachate and other harmful organic compounds, and capable of transporting air into the compost.

Frames 118 contain a curved depression 109 which accommodates the aeration & drain pipe 106. A clamp 123 can then be placed over the aeration & drain pipe 106 and secured to the frame 118. Frame 118 can be placed within a liner 126 which can be made of plastic or any other suitable material, and which frame is placed on top of a temporary form board 98. Frame 118 holds the aeration & drain pipe at a specified distance from the finished floor surface 120 (shown in FIG. 5) preventing the aeration & drain pipe 106 from resting on the ground; and for supporting the concrete rebar that is placed parallel to the aeration and drain pipe The liner 126 serves as a concrete containment form, and also prevents fluids that are not captured in the aeration & drain pipe 106 to be captured by the liner, thereby preventing harmful fluids from seeping into the soil.

Aeration & drain pipe 106 also contains slots 107. Slots 107 allow fluids to enter into the aeration & drain pipe 106 from a floor surface above the aeration & drain pipe 106. The fluids can then be carried from the aeration & drain pipe 106 into an appropriate holding vessel, leaching pond, etc. (not shown).

Slots 107 do not extend continuously over the entire length of the aeration & drain pipe 106 because this could cause the aeration & drain pipe to lose some of its rigidity and become deformed. Bridges 117 are located in-between slots 106 to further sustain rigidity and structural integrity to the aeration & drain pipe 106. Further, the slots 107 may not extend to the edge of the aeration & drain pipe 106. This provides additional structural support as well as allows transverse reinforcing bars to be placed across the aeration & drain pipe 106 to enhance the structural integrity of the concrete slab.

Located on top of the aeration & drain pipe 106 and above slots 117 is the air and liquid transfer element 103. The air and liquid transfer element 103 is the interface between the aeration & drain pipe 106 and the top of the floor 120 (shown in FIG. 5). The air and liquid transfer element allows fluids to flow from the surface of floor 120, through holes located on the top of the air and liquid transfer element, through the slots 107 and into the aeration & drain pipe 106, and conversely permits air transported by the aeration and drain pipe 106 to flow upward through slots 107, through the holes located in top of the air & liquid transfer element, and thus into the compost material placed on the floor slab 120. The air and liquid transfer element will be discussed in further detail below.

A removable cap strip 112 is located on top of the air and liquid transfer element 103 and prevents debris/wet concrete from clogging holes on the top of the air and liquid transfer element during construction and concrete placement. Cap strip 112 is designed to be removable. Plugs 116 are shown at each edge of air and liquid transfer element 103. Plugs 116 prevent fluids wet concrete from migrating into the end of the air and liquid transfer element 103. Located on an end of the aeration & drain pipe 106 may be an air and water delivery system 140. In a composting environment, it is desirable to be able to deliver oxygen to the microbes breaking down the organic material, and to remove leachates and free water from the surface of the floor slab 120. A primary pipe 144 can be supported by a pipe stand 145 and attached to the aeration & drain pipe 106 via fitting 142. Air can then be fed through the primary pipe 144 into aeration & drain pipe 106. Air is then forced up through the slots 107 and through air and liquid transfer element 103 and onto the surface of the floor. Once on the floor surface, the air can permeate the compost pile and provide the correct amount of oxygen to the microbes.

Optionally, one or more sensors can be placed in the compost pile. When the oxygen or temperature level in the compost gets below a certain value an air pump connected to the primary pipe 144 can be turned on, pumping air into the compost, and keeping the microbes breaking down organic material at the optimum level.

Additionally, a clean-water pipe 128 can be used in the system to periodically flush out the aeration & drain pipe. As discussed above, the system can be used in a composting environment. While the aeration & drain pipe is designed to remove fluids and tiny particles, it may become necessary to clean out the pipe due to a blockage in the aeration & drain pipe 106. In such event, a clean-water pipe 128 can be used to supply clean water to the aeration & drain pipe 106. The clean water supplied to the aeration & drain pipe 106 can then flush out any debris that is located in the aeration & drain pipe 106.

Figure 2:
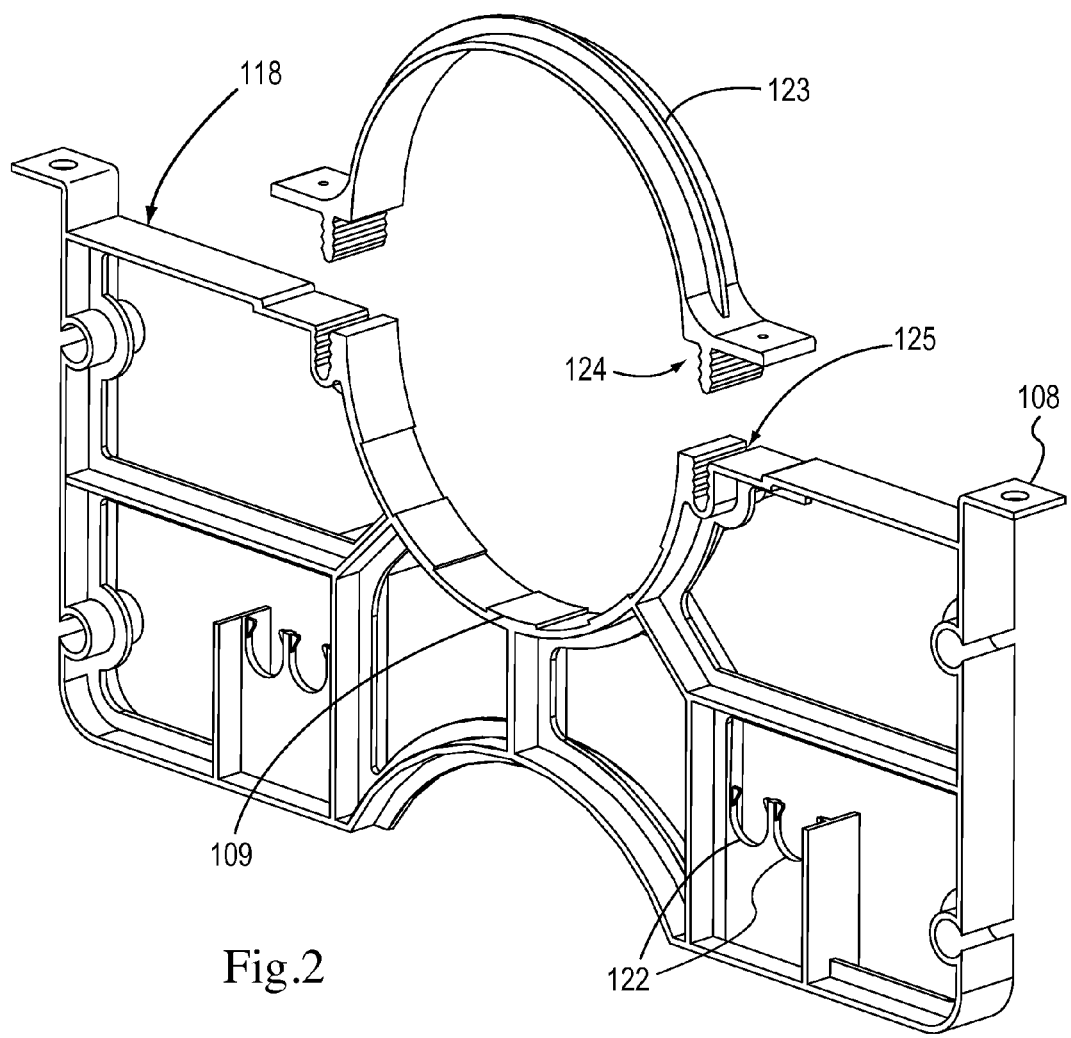
FIG. 2 is an exploded perspective view of a frame.

FIG. 2 shows a perspective view of frame 118. Frame 118 can be made from plastic or any other suitable material. Frame 118 is generally rectangular in form and has a depression 109 which is designed to accommodate the aeration & drain pipe 106. With an aeration & drain pipe 106 positioned inside of depression 109, clamp 123 is then positioned over the aeration & drain pipe 106. The clamp 123 is secured to the frame 118 by a locking mechanism, and serves to keep the aeration and drainage pipe 106 securely in place, and accurately positioned, during concrete placement, the latter being particularly important as hydraulic pressure applied by the wet concrete tends to cause flotation of the aeration and drainage pipe 106.

Figure 2A:
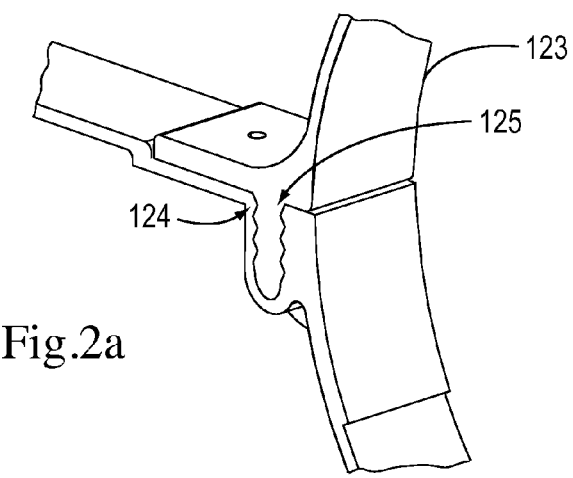
FIG. 2a is an enlarged view of the locking mechanism of FIG. 2.

The locking mechanism can be implemented for example by using a male locking part 124 and inserting it into a female locking part 125. For example, a serrated tongue and groove system can be used to secure the clamp 123 to the frame 118, as shown in FIG. 2a.

Frame 118 can be secured to temporary form board 105 via a tab 108, with a screw, nail, or other fastening device to affix the frame 118 to the temporary form board 105.

Frame 118 also may contain slots 122 which are designed to accommodate reinforcing bars, such as rebar. Rebar can then be inserted into slots 122 such that the rebar is parallel with the aeration & drain pipe 106. The reinforced floor ensures that heavy loads can be superimposed on the floor without causing damage to the floor.

Figure 3:
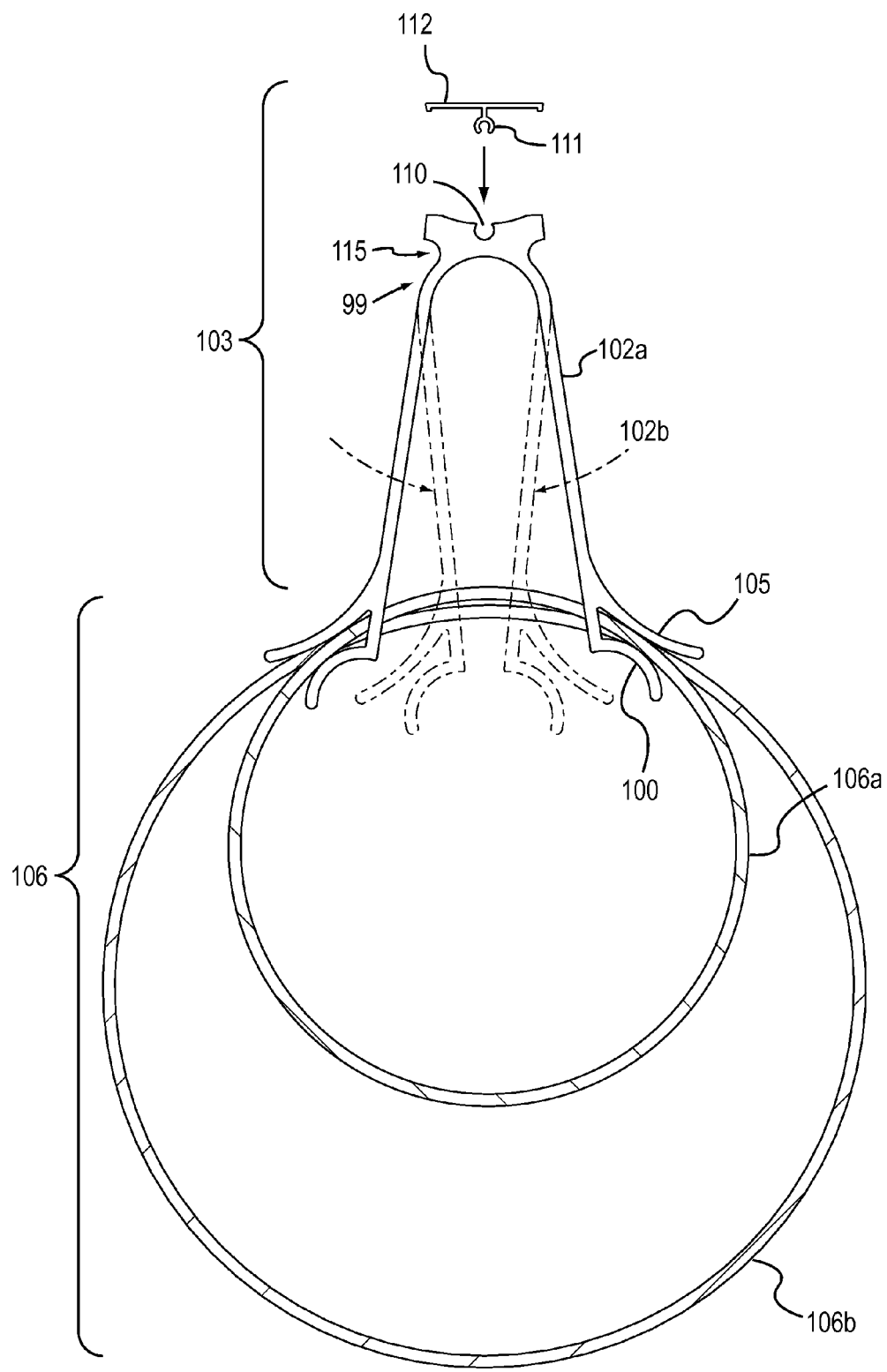
FIG. 3 is an end view of the aeration & drain pipe and air and liquid transfer element.

FIG. 3 shows an end view of the air and liquid transfer element 103 attached to the aeration & drain pipe 106. As shown in FIG. 3, the air and liquid transfer element 103 has a generally inverted U shape. The bottom of air and liquid transfer element 103 opens up into the slot 107 of the aeration & drain pipe 106. This allows fluid captured in the air and liquid transfer element 103 to fall into the aeration & drain pipe 106. Further, this helps to prevent the air and liquid transfer element 103 and aeration & drain pipe 106 from getting clogged. Further it channels the upward flowing air from the aeration & drain pipe into, and through the holes 113 (FIG. 4) into the compost placed on the floor 120.

Air and liquid transfer element 103 includes flexible sidewalls 102a/102b. The flexible sidewalls allow the air and liquid transfer element to fit various size aeration & drain pipes 106. Further, the top of the inverted U-shaped air and liquid transfer element 99 acts like a spring, allowing the sidewalls 102a/102b to flex inward and outward for the purpose of connecting the air and liquid transfer element 99 to engage the slots 107 in the aeration and drain pipe 106, without necessitating the use of glue, screws, or any mechanical, chemical bonding or other connection method.

As shown in FIG. 3 the air and liquid transfer element 103 is adjustable to fit a large diameter aeration & drain pipe 106b or a small diameter aeration & drain pipe 106a. Top flange 105 goes on the top of the aeration & drain pipe 106 and bottom flange 100 goes on the bottom of the aeration & drain pipe 106. Together, top flange 105 and bottom flange 100 secure the air and liquid transfer element to the aeration & drain pipe 106. Flanges 105 and 100 can have a radius to make it easier to fit the flanges on the aeration & drain pipe. Bottom flange 100 has a downward curving radius while top flange 105 has an upward curving radius. The curved flanges allow the edge of the aeration & drain pipe 106 to be quickly and easily guided into the proper position.

In order to fit the air and liquid transfer element 103 to the aeration & drain pipe 106, the sidewalls 102 are pressed in and the flanges 105 and 100 of the air and liquid transfer element 103 are aligned with the outer circumference of the aeration & drain pipe. The depressed sidewalls 102b are then released, allowing the sidewalls to extend and causing the flanges 105 and 100 to fit, respectively above and below the outer and inner circumference of the aeration & drain pipe 103.

A depression 115 is also shown in FIG. 3, below the top edge 114 of the air and liquid transfer element 103. The depression 115 is to allow concrete to more securely fasten and bind the air and liquid transfer element 103. Further, the depression helps to ensure a tighter fit such that fluids do not go in between the air and liquid transfer element 103 and the concrete.

Removable cap strip 112 is shown on the top of the air and liquid transfer element 103. Protrusion 111 is located on the bottom of the cap strip 112. This protrusion can then align with a receiving slot 110 of the air and liquid transfer element 103. Thus, the cap strip 112 can be held in place by the protrusion 111 and receiving slot 110 until the cap strip 112 is ready to be removed from the air and liquid transfer element 103.

Figure 4:
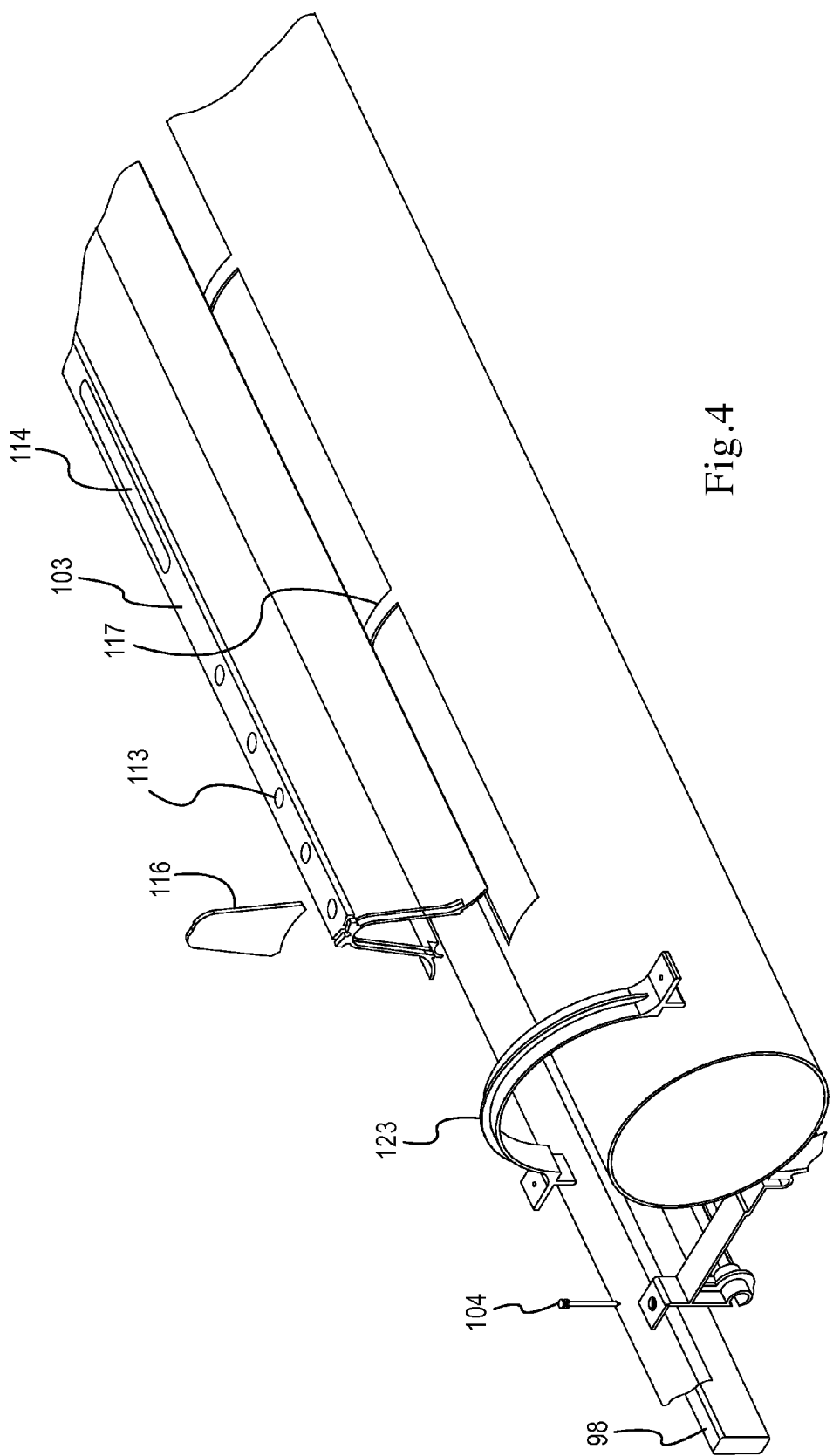
FIG. 4 is an exploded perspective view of the aeration & drain pipe and air and liquid transfer element.

The air and liquid transfer element 103 can also include plugs 116, as best shown in FIG. 4, which attach to the end of the air and liquid transfer element 103 and prevent air from escaping out of the side of the air and liquid transfer element, and to prevent wet concrete—during concrete placement—from migrating into the air and liquid transfer element 103. Plugs 116 can be attached by gluing, ultrasonic welding, fusing, chemical bonding, screwing, or any other suitable means.

As shown in FIG. 4, the top edge 114 of the air and liquid transfer element 103 includes a series of holes 113 which allow fluid to enter the air and liquid transfer element, and keep out larger sized debris. The holes 113 also allow air to be pumped onto the floor surface and oxygenate the compost or other material. Holes 113 can be pre-drilled during the manufacture of the air and liquid transfer element 103, or can be made after the device has been installed. If many holes are desired, then the holes 113 will typically be pre-drilled at the factory. Holes 113 are not limited to circles, but can also be elongated slots, ovals, etc. For compost aeration the holes 113 can be round and small, while for a biofilter, holes 113 can be round with close spacing in between holes, for maximum transporting of air. For animal excretions, holes 113 can be large and/or closer together and elongated.

Figure 5:
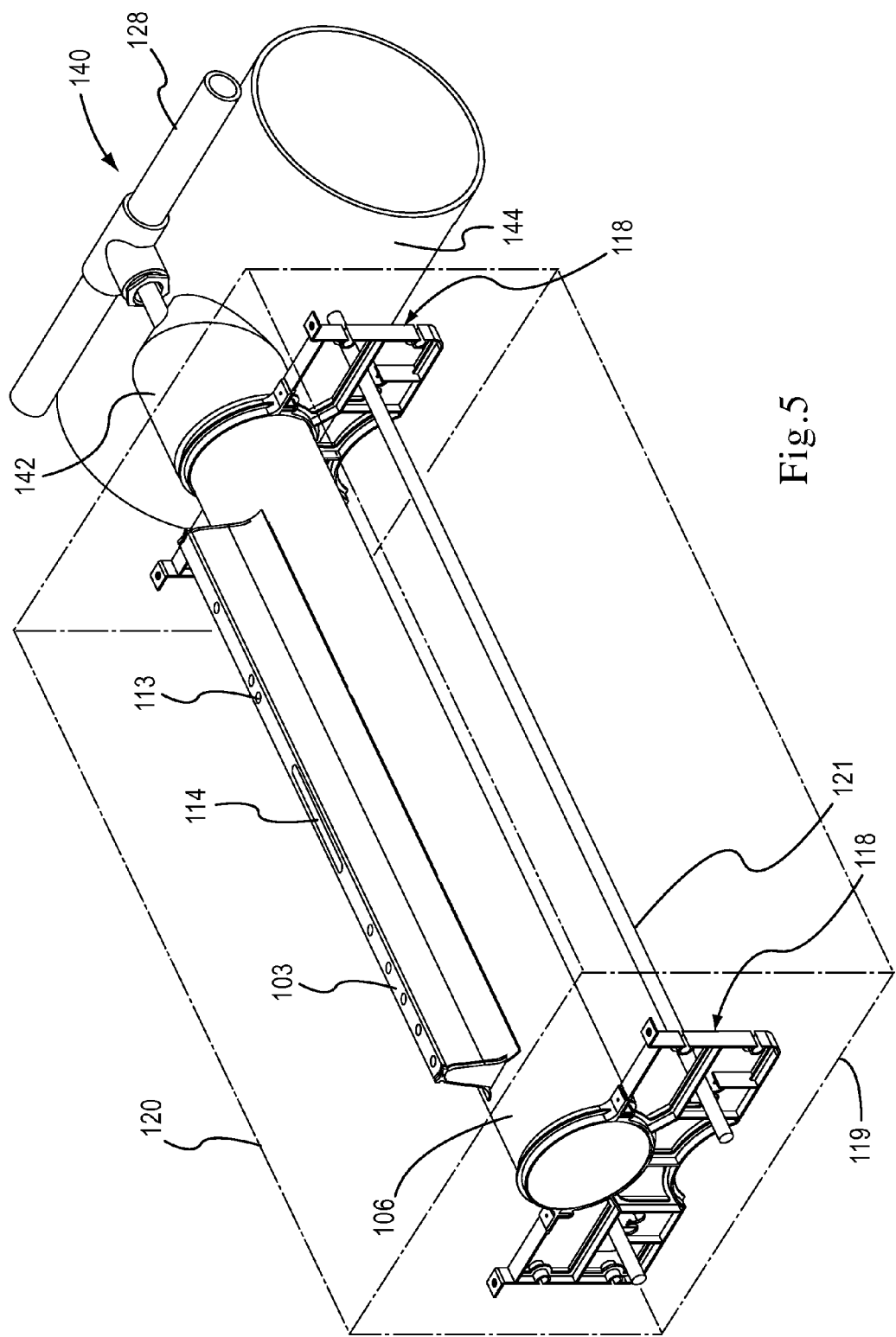
FIG. 5 is a perspective view of the aeration & drain pipe, air and liquid transfer element, and frames with the water jet and air flow system shown in a concrete floor.

FIG. 5 shows an assembled view of an aeration and drainage system 90 in a concrete slab. The cover strip 112 of the air and liquid transfer element 103 is removed and the holes 113 are slightly recessed within the top of the concrete slab 120. The top edge 114 of the air and liquid transfer element 103 is recessed in the concrete slab for several reasons. By recessing the top edge 114, fluids will naturally collect at this low point in the floor. Recessing also extends the life of the aeration and drainage system 90. When trucks and other heavy vehicles, animals, loads, etc. are on the floor, they will not contact the top edge 114 of the air and liquid transfer element 103 as it is recessed, but will instead simply come in contact with the concrete floor.

As the aeration and drainage system 90 is permanently fixed within the concrete floor, cleaning the aeration & drain pipes 106, which eventually are clogged, becomes critical. A water delivery system may be incorporated with the aeration and drainage system 90 in order to facilitate easy cleaning of the system. Clean-water pipes 128 provide water to aeration & drain pipes 106, thereby flushing out any unwanted debris in the aeration & drain pipes 106. Further, an air pump may be connected to primary pipe 144 to supply air to the aeration and drainage system 90.

Figure 6:
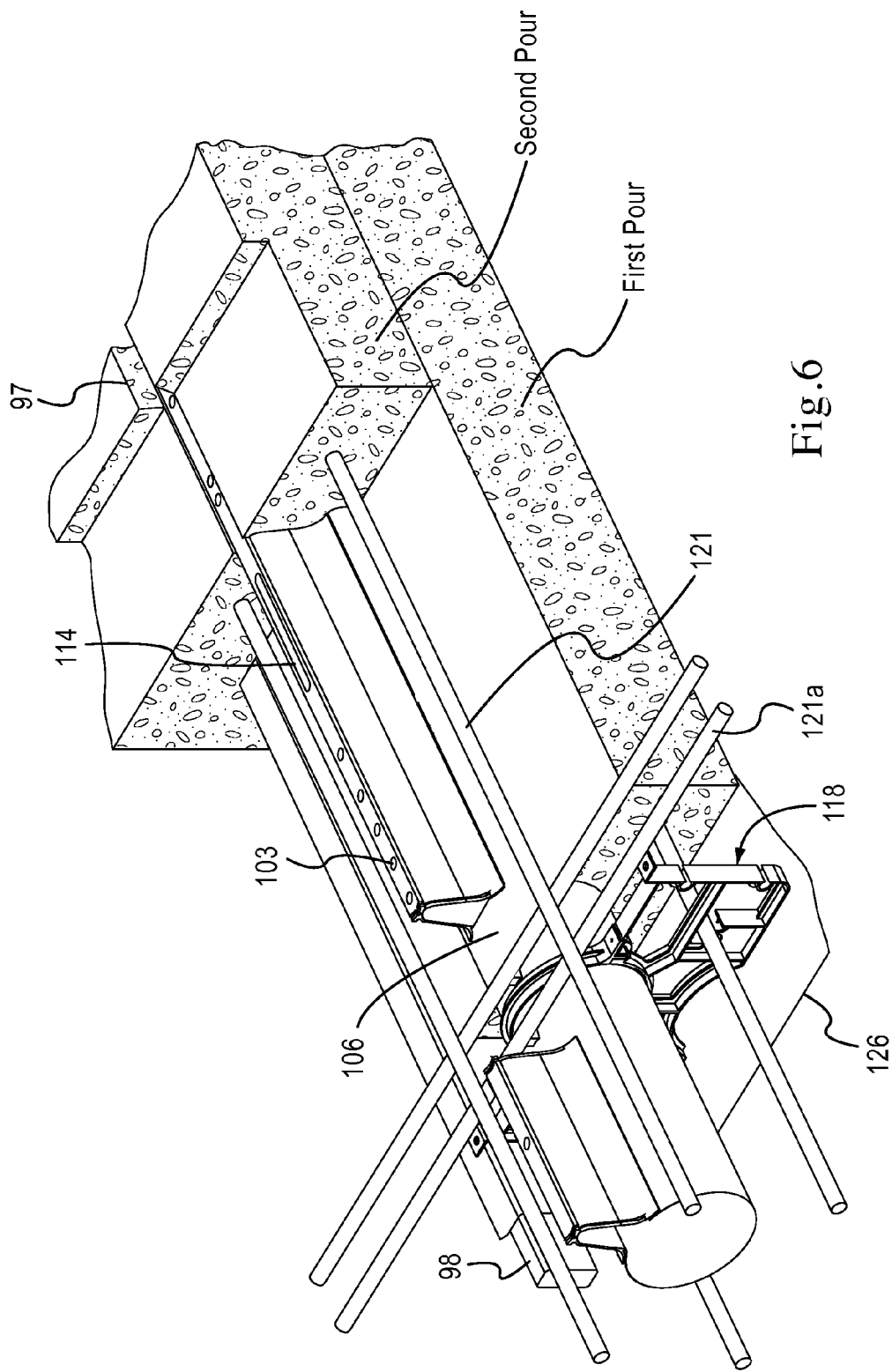
FIG. 6 is a perspective view of the drainage and aeration system installed in the floor, with multiple cutaway levels shown.

As best shown in FIG. 6, there are several stages to installing an aeration and drainage system 90. Once an appropriate location is chosen for the aeration and drainage system 90, the system must be properly laid out. This includes calculating the spacing between aeration & drain pipes 106 based on the amount of air that is required for the composting or biofilter operation, or for fluids the system is designed to remove. The appropriate size aeration & drain pipes 106 must also be chosen. The air and water delivery system 140 may also be laid out, if desired in the system, depending on the size of the aeration and drainage system 90 to be served.

Once the layout of the aeration and drain system along with the air and water delivery system is complete, installation may begin. A liner 126 is laid out, within a temporary form board 98, and frames 118 are placed in the liner, between the temporary form boards 98, and attached thereto. Reinforcing bars such as steel rebar 121 can then be inserted into slots 122 in order to provide for structural reinforcing for the concrete. Aeration & drain pipe 106 can then be placed on the frames 118 and secured thereto using clamps 123. Air and liquid transfer element 103 will already be attached to the aeration & drain pipe 106 when it is placed in the frames. At this stage of assembly the first concrete will be poured into the liner 126, and encasing the bottom rebar 121, the frames 118, and the lower half of the aeration and drain pipe 106. After the concrete is sufficiently set, the temporary wood form boards 98 can be removed, and the slab sub-grade prepared for placement of the concrete slab during the $2^{nd}$ and final pour.

118. An additional layer of rebar 121a can then be placed transversely with the aeration & drain pipe 106. The transverse rebar 121a rests upon a rebar chair which allows the rebar to be fully encased in concrete in accordance with standard concrete practice. Additional layers of rebar 121 may then be placed parallel with the aeration & drain pipes 106, as shown in FIG. 6.

Once the aeration and drainage system 90, along with the air and water delivery system are in place, the concrete floor slab can be poured. Because the cap strip 112 covers holes 113, concrete can be poured over and on the aeration and drainage system 90, with no worry about clogging the holes 113. This greatly increases the efficiency of installing the system. For the first pour, concrete is poured, for example up to the top of the liner 126. The bottom surface 119 of the first pour is shown for example in FIG. 5. The bottom of the concrete floor is shown at the interface of the first pour and second pour. Once the concrete for the second pour is approximately the height of the top edge 114 of the air and liquid transfer element 103, the concrete can then be floated and trowelled to provide a flat surface.

Figure 7:
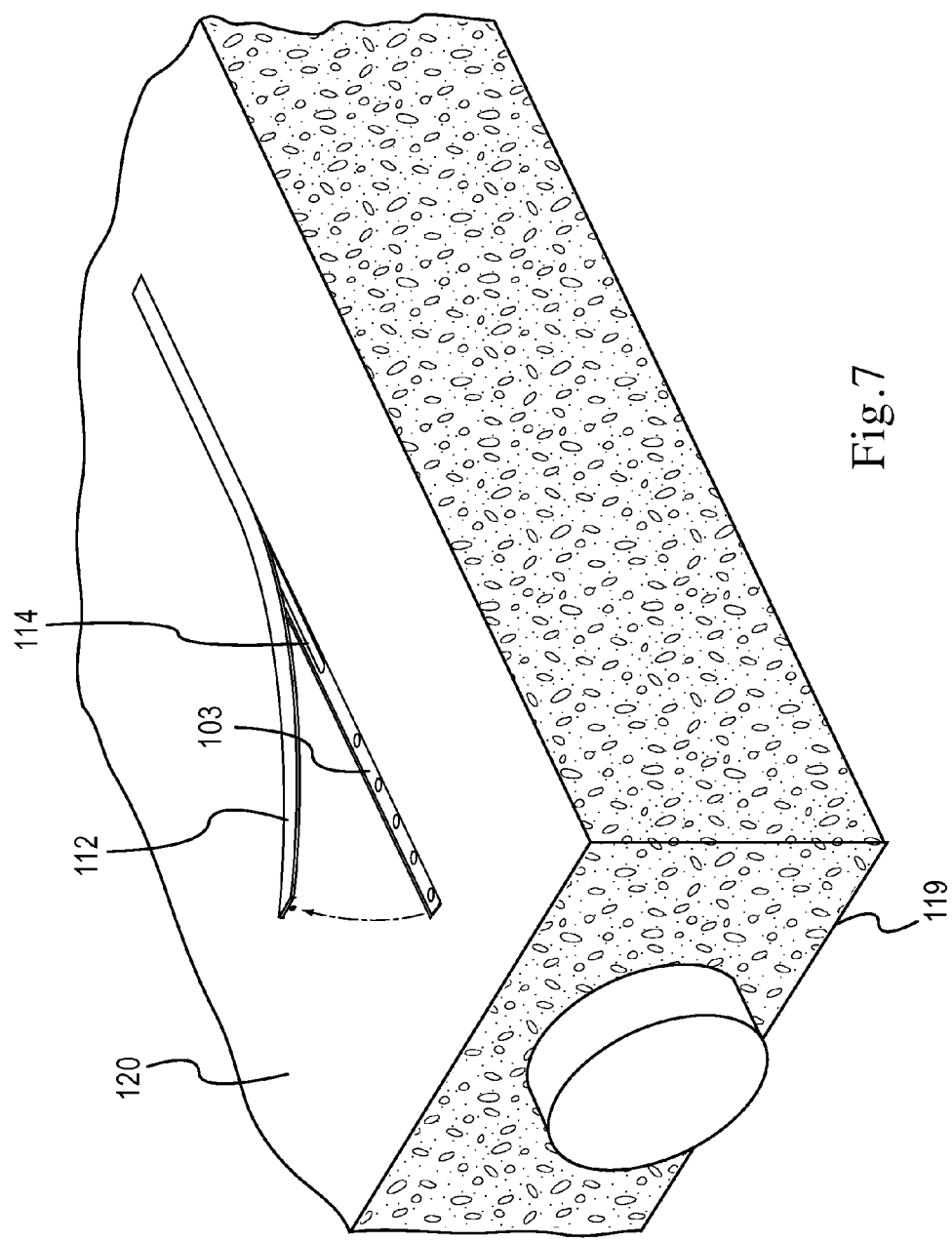
FIG. 7 is a perspective view of the cap strip being removed.

At this point, the concrete will cover the top edge 114 of the air and liquid transfer element 103. However, as the cap strip 112 remains on top of the air and liquid transfer element 103, concrete will not clog up the holes 113. Before the concrete is fully set, the cap strip 112 can then be removed, as best shown in FIG. 7. The concrete around the cap strip 112 can be removed with a trowel or screw driver for example, and then the cap strip 112 can be pulled off of the air and liquid transfer element 103. This leaves a perfectly clean opening in the top edge 114 of the air and liquid transfer element 103. Holes 113 are thus perfectly clean and free of debris. This also provides for a slightly recessed top edge 114, as discussed earlier.

In certain cases it will be desired to raise the concrete floor higher above the top edge 114, and to create a custom drainage slot or reveal 97 in order to create a more effective drainage channel for compost leachate or for liquids on the floor.

Figure 8:
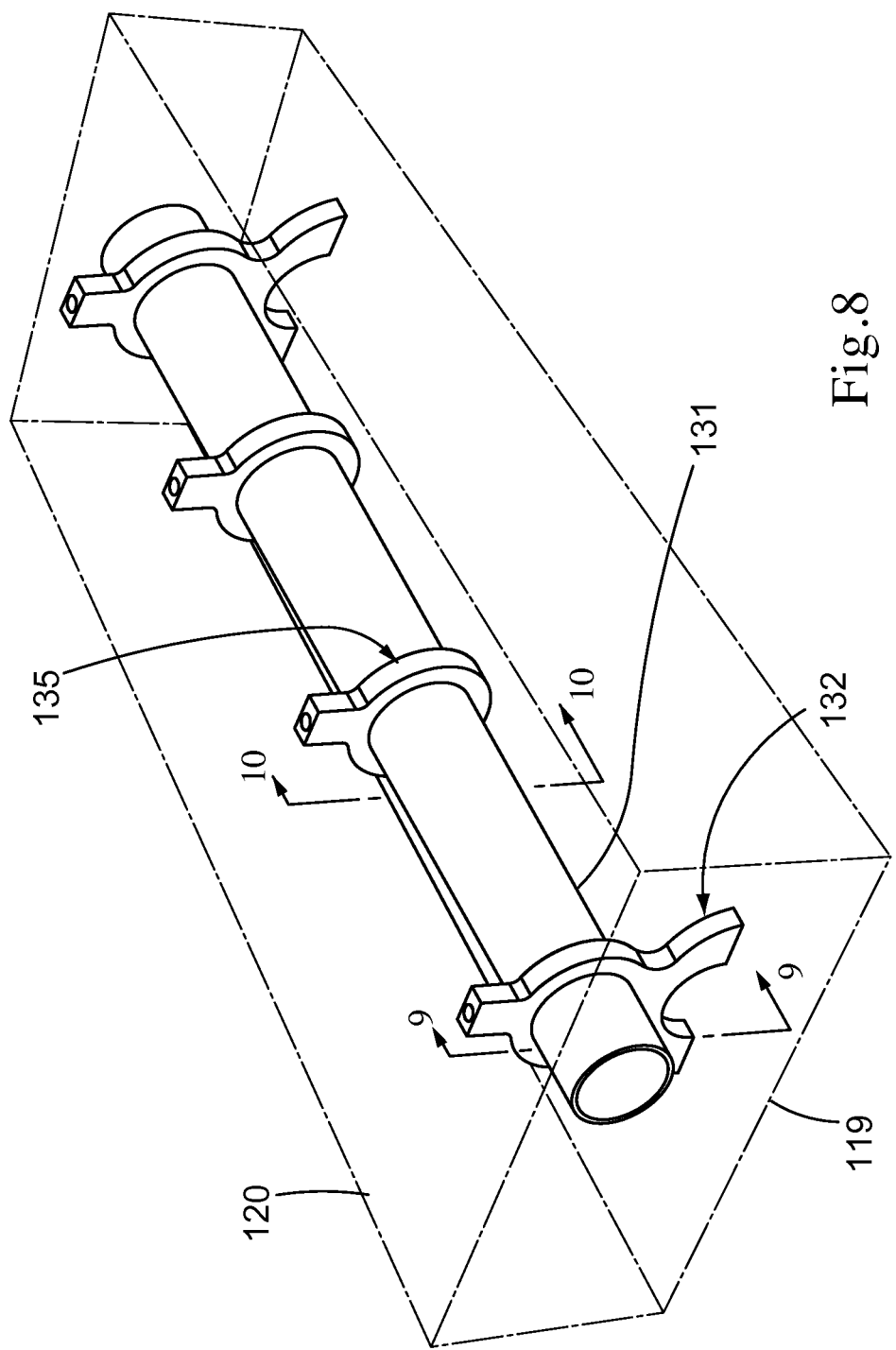
FIG. 8 is a perspective view of a second embodiment showing an aeration pipe and stands in a concrete block.
Figure 9:
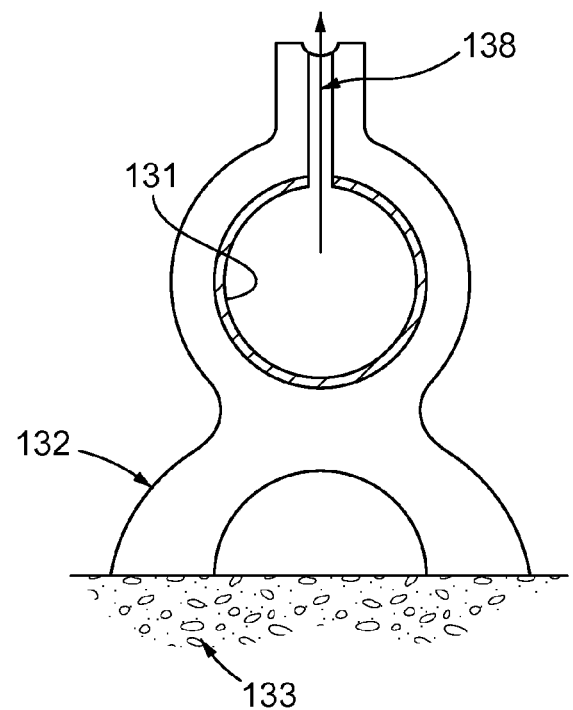
FIG. 9 is an end view of a stand.

A second embodiment of the disclosure, and more applicable to smaller composting system installations, is shown in FIGS. 8-11. FIG. 8 shows an aeration system in a slab of concrete. Air pipe 131 is supported by stands 132 Stand 132 can rest upon sand, gravel, or any other suitable compact surface. Stands 132 help prevent displacement of the air pipe 131 when concrete is poured over the aeration system. Intermediate holders 135, serve to transport air from air pipe 131, similarly to 132, but without being supported on the surface 133 (FIG. 9).

Concrete is poured up to the top of stand 132 and holder 135. These points provide a screed level at which the concrete should be leveled at. FIG. 9 shows a view taken along line 9-9 shown in FIG. 8. As shown in FIG. 9, a hole 138 is shown at the top of stand 132 and 137. This hole is supplied pre-drilled, and serves to transport air from the air pipe 131 into the compost placed on top of the slab 120. During construction a screw may be placed into these holes, and self-drilled into the air pipe 131 to maintain accuracy of spacing, and integrity of the assembly of all components, discussed in more detail below.

Further, stand 132 can rest in a liner, or simply on gravel, sand, or any other relatively flat surface 133.

Figure 10:
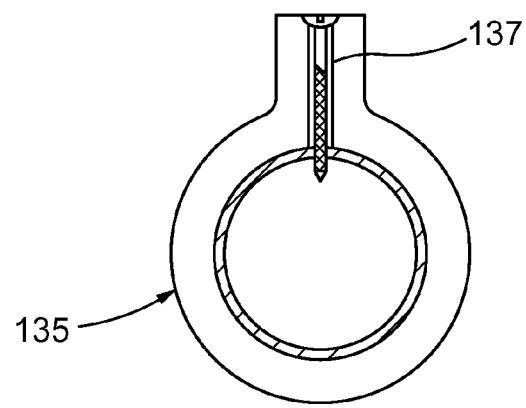
FIG. 10 is an end view of a holder.
Figure 11:
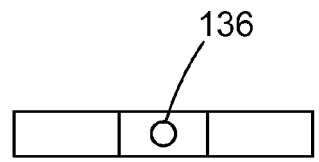
FIG. 11 is a top view of a holder or stand.

FIG. 10 shows a view taken along the line 10-10 as shown in FIG. 8. FIG. 10 shows an end view of a holder 135. A screw 137 is shown in the upper part of the holder 135. Upon installing the aeration and drainage system, the screw 137 can be removed, and a slightly larger diameter hole re-drilled in the same location, thereby creating a clean hole which allows air to be transported from the air pipe 131 into the compost, FIG. 11 shows a top view of holder 135 and support 132, and a round aeration hole 136.

An air pump may also be attached to the air pipe(s) 131 in order to pump air onto the floor surface and aerate a compost pile or other substance.

While embodiments of the present disclosure have been particularly shown and described with reference to exemplary embodiments thereof, it will be understood by those of ordinary skill in the art that various changes in form and details may be made therein without departing from the spirit and scope of the present invention as defined by the following claims.

We claim:

1. An aeration and drainage system, comprising:
   an aeration & drain pipe having slots on an upper surface thereof;
   a frame holding said aeration & drain pipe below the upper surface of said aeration & drain pipe; and
   an air and liquid transfer element attached to said aeration & drain pipe and positioned over said slots;
   wherein said air and liquid transfer element extends upward from said slots,
   wherein said air and liquid transfer element contains openings on a top surface thereof to allow fluids to flow into and out of the air and liquid transfer element, and through the slots in the aeration & drain pipe, and
   wherein said frame includes at least one rebar support slot for concrete reinforcing bars.

2. The aeration and drainage system of claim 1, further comprising:
   a removable cap strip positioned on the top surface of the air and liquid transfer element and covering the openings of said air and liquid transfer element.

3. The aeration and drainage system of claim 1,
   wherein said air and liquid transfer element has a plurality of legs, and wherein each leg of said air and liquid transfer element has a top flange and a bottom flange, each of the top flange and the bottom flange attaching to said aeration & drain pipe.

4. The aeration and drainage system of claim 1, further comprising a clamp which is fittable to said frame, such that said frame and said clamp cumulatively surround said aeration & drain pipe, thereby resisting flotation of said aeration & drain pipe during concrete pours.

5. The aeration and drainage system of claim 1, further comprising:
a primary pipe connected to said aeration & drain pipe, and
an air pump connected to said primary pipe.

6. The aeration and drainage system of claim 1, further comprising:
a clean-water pipe connected to said aeration & drain pipe; and
a clean water source connected to said water pipe.

7. The aeration and drainage system of claim 1, further comprising:
a liner, and
wherein said frame rests upon a bottom of said liner.

8. The aeration and drainage system of claim 7, wherein said frame is engageable with vertical sides of said liner, said liner having a rectangular shape.

9. The aeration and drainage system of claim 1, wherein said air and liquid transfer element has an inverted U-shape in cross-section, such that an open end of the inverted U-shape opens into said slots.

10. A method of assembling a drainage and aeration system, comprising:
placing a frame on a surface;
placing an aeration & drain pipe on said frame, said aeration & drain pipe having slots located on an upper surface thereof;
placing an air and liquid transfer element into said slots of said aeration & drain pipe; and
placing rebar in at least one rebar support slot located on the frame,
wherein said air and liquid transfer element contains openings to allow fluids to pass through and into said aeration & drain pipe, and
wherein said openings are even or slightly recessed from a surface of a floor to be formed by concrete pouring.

11. The method of claim 10, further comprising:
placing a lining down on the surface, such that said frame rests upon said lining.

12. The method of claim 11, further comprising:
pouring concrete inside said liner, in a first pour, and then pouring concrete in a second pour such that a top surface of the poured concrete is even with or slightly above a top surface of the air and liquid transfer element.

13. The method of claim 10, wherein said air and liquid transfer element comprises a removable cap strip on a top surface thereof, such that said removable cap strip covers the openings of said air and liquid transfer element.

14. The method of claim 13, further comprising:
removing the cap strip.

15. The method of claim 10, further comprising:
flushing the aeration & drain pipe with clean-water using a clean-water pipe which is in communication with said aeration & drain pipe.

16. The method of claim 10, further comprising:
pumping air to the surface of the floor, through the air and liquid transfer element by providing air from a primary pipe which is connected to the aeration & drain pipe.

17. The method of claim 10, wherein said air and liquid transfer element has an inverted U-shape in cross-section, such that an open end of the inverted U-shape opens into said slots.

18. An aeration and drainage system, comprising:
an aeration & drain pipe which has slots on an upper surface thereof;
a U-shaped liner;
a frame holding said aeration & drain pipe above a bottom surface of said U-shaped liner; and
an air and liquid transfer element attached to said aeration & drain pipe, positioned over said slots and extending upward from said slots; and
wherein said frame includes at least one rebar support slot for holding rebar,
wherein said frame includes a clamp for holding said aeration & drain pipe,
wherein said air and liquid transfer element contains openings on a top surface thereof to allow fluids to flow into and out of the air and liquid transfer element and through the slots in the aeration & drain pipe, and
wherein a concrete floor is capable of surrounding said aeration and drainage system.

19. The aeration and drainage system according to claim 18, further comprising:
a removable cap strip located on the top surface of said air and liquid transfer element.

* * * * *